March 8, 1949.  R. O. MESSIER  2,463,896
HYDRAULIC TRAILER HITCH
Filed Nov. 4, 1947  3 Sheets-Sheet 1
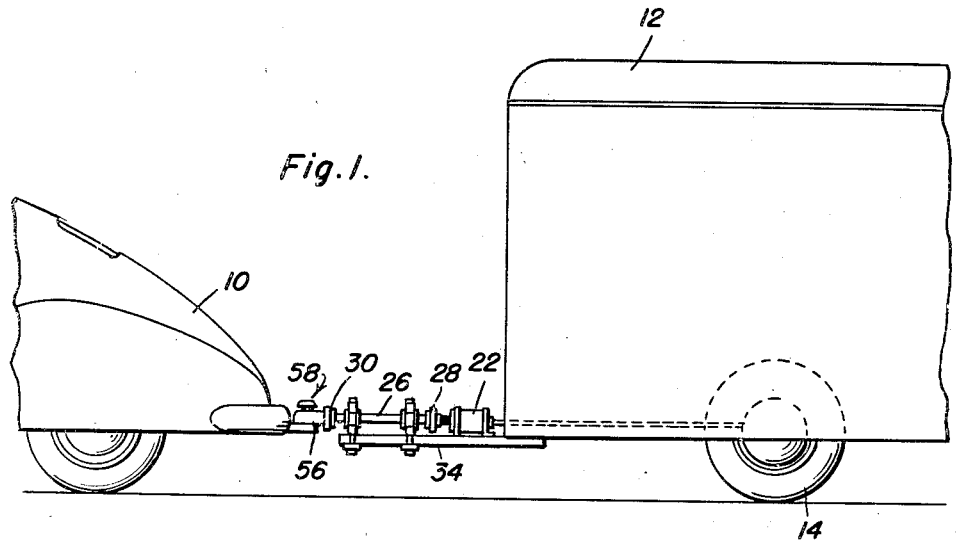
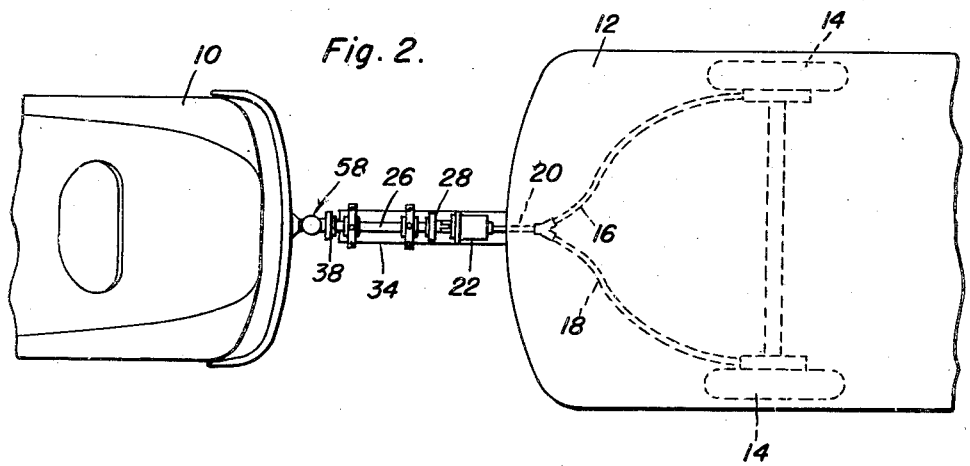
Inventor
Rudolph O. Messier
By *Clarence A. O'Brien
and Harvey B. Jacobson*
Attorneys March 8, 1949.  R. O. MESSIER  2,463,896
HYDRAULIC TRAILER HITCH
Filed Nov. 4, 1947  3 Sheets-Sheet 2
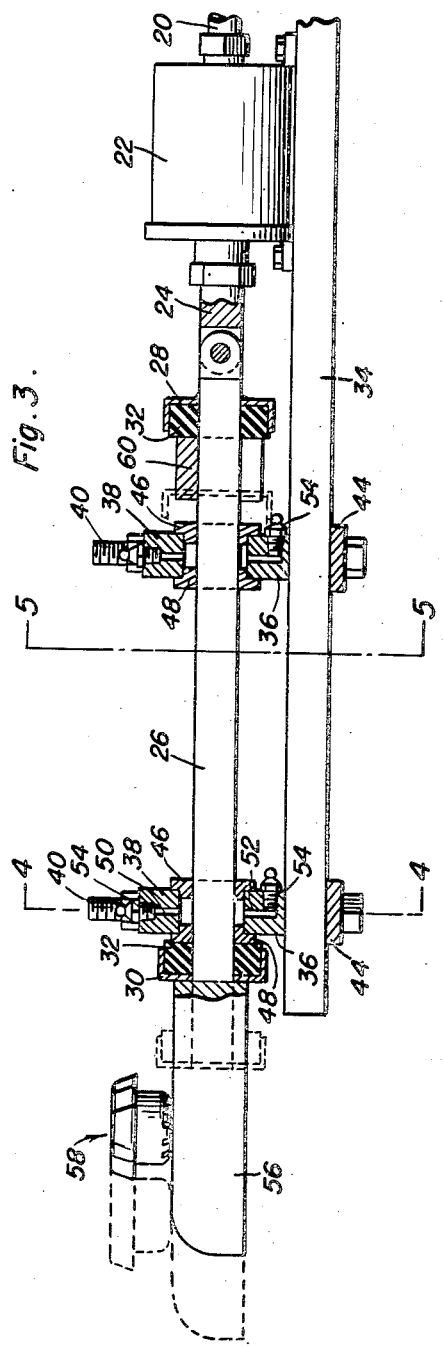
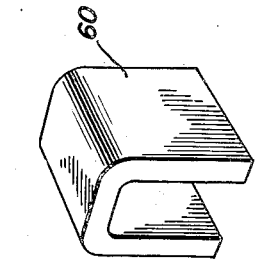
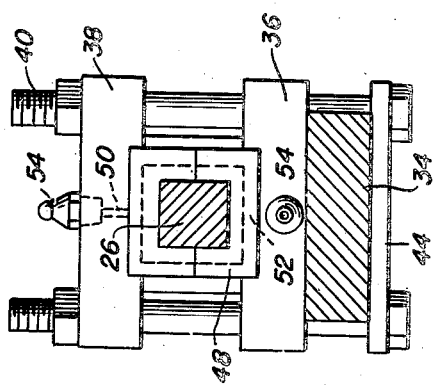
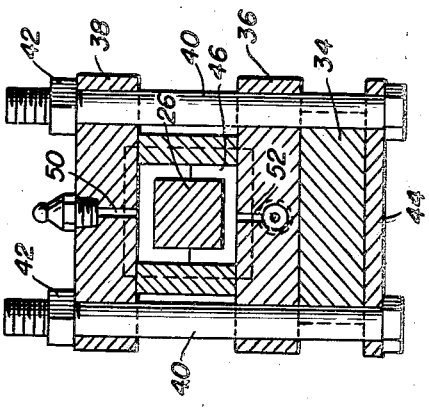
Inventor
Rudolph O. Messier
By *Clarence A. O'Brien*
and *Harvey B. Jacobson*
Attorneys March 8, 1949.　　　　　R. O. MESSIER　　　　　2,463,896
HYDRAULIC TRAILER HITCH
Filed Nov. 4, 1947　　　　　　　　　　　　　3 Sheets-Sheet 3
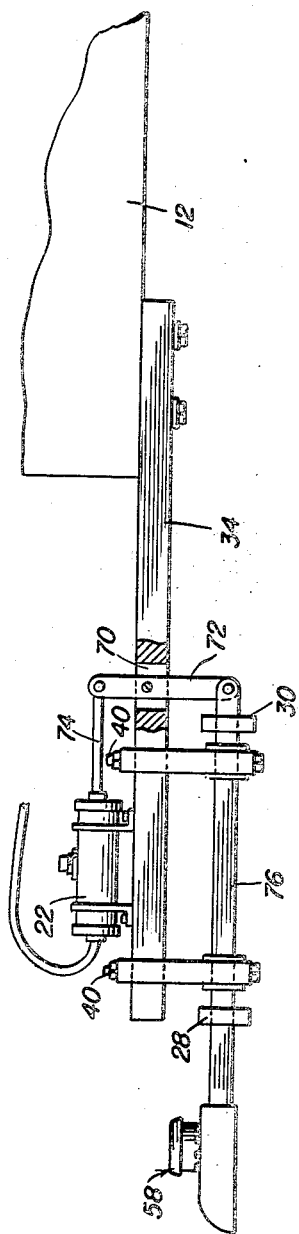
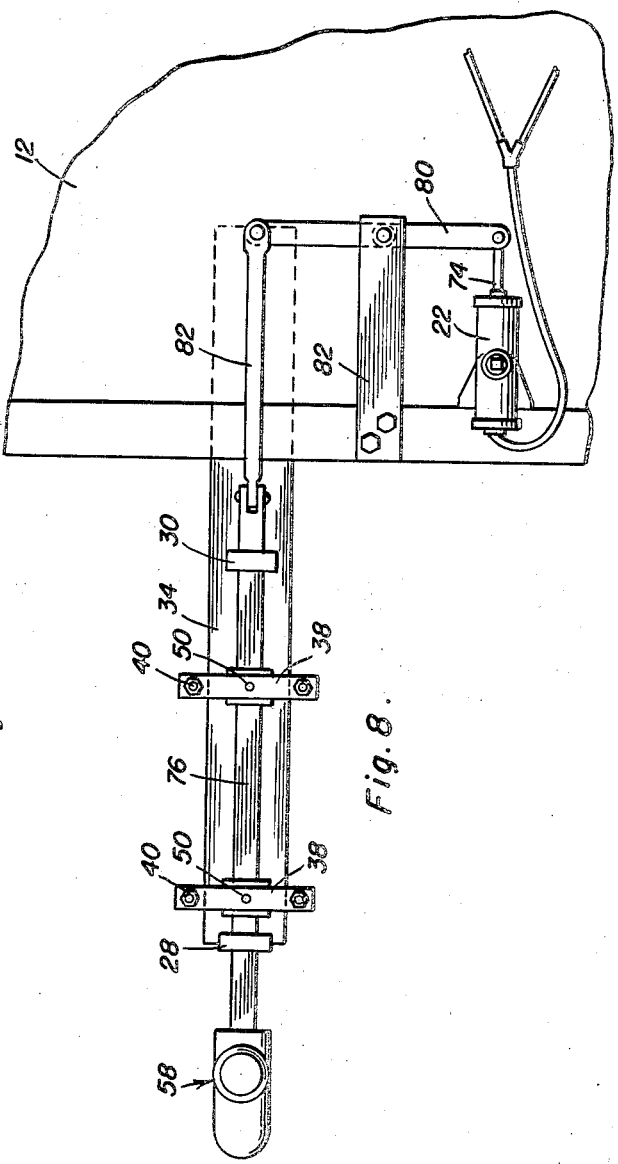
Rudolph O. Messier
INVENTOR.
BY *Clarence A. O'Brien*
*and Harvey B. Jackson*
Attorneys Patented Mar. 8, 1949

2,463,896

UNITED STATES PATENT OFFICE 2,463,896

HYDRAULIC TRAILER HITCH

Rudolph O. Messier, Jacksonville, Fla.

Application November 4, 1947, Serial No. 783,901

4 Claims. (Cl. 188—142)

1

This invention appertains to novel and useful improvements in trailer hitches which may be utilized in association with large or small scale trailers, adapted to be towed by a prime mover.

An object of this invention is to tow a trailer and automatically lock the wheels of the said trailer under predetermined conditions.

Another purpose of this invention is to provide means for carrying out the above mentioned function.

Another purpose of this invention is to provide a hydraulic cylinder on a trailer drawbar and means for actuating said hydraulic cylinder which in turn actuates the braking system of the said trailer.

Another purpose of this invention is to provide improved means for journalling a piston rod which is pivotally associated with the piston within the said cylinder and means for limiting the travel of this piston rod.

Another purpose of this invention is to provide an extremely efficient, safe device of the character described which is inexpensive and which may be adapted to many types of trailers.

Ancillary objects and features of novelty will become apparent to those skilled in the art, in following the description of the preferred form of the invention, illustrated in the accompanying drawing, wherein:

Figure 1 is an elevational side view of the invention showing the same utilized in conjunction with an automobile and a trailer;

Figure 2 is a plan view of the invention shown in Figure 1;

Figure 3 is an elevational side view of the invention, portions being broken away in section to illustrate details of construction;

Figure 4 is a transverse sectional view of the invention shown in Figure 3 and taken substantially on the line 4—4 thereof and in the direction of the arrows;

Figure 5 is a sectional view taken on the line 5—5 of Figure 3 and in the direction of the arrows;

Figure 6 is a perspective view of the boss utilized in association with the present invention, forming means for limiting the travel of the piston rod associated therewith;

Figure 7 is an elevational view of a second embodiment of the invention, and

Figure 8 is a plan view of a third embodiment of the inventive concept.

Referring now in detail to the illustrated preferred forms of the present invention, like reference characters are used throughout to indicate similar elements thereof.

This invention has been conceived and developed for the purpose of providing a safety feature for use in conjunction with automobile towed trailers, whereby the said trailer may be locked (the brakes thereof) in a selected position during certain conditions of operation.

A conventional automotive vehicle is illustrated at 10 and is shown in Figures 1 and 2. Associated with this vehicle 10 is a conventional trailer 12 having wheels 14 associated therewith. Associated with the said wheels is a conventional hydraulic brake system having conduits 16 and 18 extending to a master conduit 20.

Referring particularly now to Figure 3, it will be seen that the said master conduit 20 terminates in a cylinder 22 having a piston (not shown) therein. A piston rod 24 extends from within the said cylinder 22 and has an extension piston rod 26 pivoted thereto. It is noted at this point that housings 28 and 30 respectively are rigidly secured to the said piston rod 26 by any suitable means such as welding, brazing or the like. Within the said housings 28 and 30 respectively there is provided rubber bumpers 32.

A conventional drawbar 34 extends from the said trailer 12 and forms the seat for the said cylinder 22. Also secured on this drawbar is the means for journalling the said piston rod 26. The preferable journalling means may be seen in Figures 4 and 5 wherein there is disclosed a pair of spaced bearing blocks 36 and 38 respectively connected by bolt means 40 having the usual nuts 42 associated therewith. A bottom plate 44 is also associated with the said bolt means 40 for the purpose of firmly clamping the said drawbar 34 therebetween. By this construction, it will be noted that the said piston rod 26 journalling means may be selectively positioned along the longitudinal axis of the said drawbar 34. Bearing plates 46 and 48 respectively having flanges therearound are provided between the said bearing blocks 36 and 38 respectively. It is upon the shoulders formed by the said flanges that these bearing blocks 36 and 38 seat on the bearing plates. A suitable aperture is provided centrally of the said bearing plates 46 and 48 for the purpose of slidably receiving the piston rod 26 therethrough. It will be noted that suitable grooves or channels 50 and 52 respectively extend through the said bearing blocks 36 and 38 respectively and a suitable grease fitting 54 is positioned at the terminal portion of the said grooves or channels 50 and 52 respectively. Obviously, a suitable lubricant is adapted to be applied to the grease fitting and alternately to the zone adjacent the piston rod 26. Sufficient lubrication is effected by this means.

At the terminal portion of the said extension piston rod 26 there is provided an enlarged portion 56 having a suitable means 58 for securing the said piston rod 26 to a prime mover such as the automobile 10 illustrated in Figure 1.

It will be noted from an inspection of Figure 3 that there are two journalling means provided on the said drawbar 34 at spaced intervals. A boss which is preferably U-shaped and indicated at 60 is provided for the purpose of frictionally engaging the said piston rod 26. It may be positioned between a selected one of the said journalling means and one of the said rubber bumpers 32 aforementioned. When the said boss 60 is positioned as disclosed in Figure 3, it is quite apparent that a force applied to the piston rod 26, which is secured to the vehicle 10, cannot urge the piston rod and consequently the drawbar more than a predetermined amount. When the vehicle and associated trailer is in a relatively stationary position, as on a hill or the like, the said drawbar may be pulled rearwardly (of the said vehicle) thereby urging the fluid in the cylinder 22 to apply the conventional hydraulically actuated brake system thereof. When the said boss 60 is positioned at the forward end of the said piston rod 26, the drawbar apparatus described above may be utilized as a conventional system. Of course, the rubber bumpers assist in balance and smoothness of operation.

Referring now primarily to Figure 7, wherein there is disclosed a second embodiment of the invention, the distinguishing features may be noted particularly as the re-arrangement of elements.

The drawbar 34 is secured to the trailer 12 by the usual means of bolts or the like and a slot 70 is provided in said drawbar. A pitman 72 is pivoted in said slot and the ends of the said pitman are connected to the piston rod 74, pertinent to the said hydraulic cylinder construction and a tow rod 76. Of course, the conventional attaching means 58 is utilized in association with the tow rod 76.

The operation of this embodiment of the invention is deemed quite apparent from an inspection of the figure. The stops or housings 28 and 30 are so positioned on the said tow rod 76 as to permit a predetermined relative movement of the draw bar 34 and the said rod 76. This movement is sufficient to apply the conventional brake system or actuate the same upon a predetermined rearward movement of the towing vehicle relative to the trailer 12.

The third embodiment of the present invention illustrates the drawbar 34 attached to a conventional trailer 12. However, the hydraulic cylinder assembly 22 is attached to the bottom of the said trailer. The piston rod 74 normally associated therewith extends to the pitman 80, which is in turn pivoted to a suitable bracket 82. This bracket 82 is permanently fixed as by bolts or the like to the undersurface of the conventional trailer 12. The opposite end of the said pitman 80 is secured to a second pitman 82 extending at substantially right angles thereto The aforementioned and described stops or housings 28 and 30 respectively are secured to the draw rod or tow bar 76 which also has a conventional hitch 58 secured thereto. The operation of this last embodiment of the invention is identical to that of the first and second embodiment, the distinguishing features in this last mentioned embodiment being also the arrangement of elements.

While there has been described and illustrated but preferred forms of the invention it is apparent that variations may be made without departing from the spirit thereof.

Having described the invention what is claimed as new is:

1. A trailer hitch comprising a piston rod, means for detachably securing said rod to a prime mover, means for journalling said rod adapted to be secured to a trailer drawbar, brake actuation means pivotally associated with said rod, means for retaining said rod in selected positions, said rod retaining means comprising a boss detachably positioned on said rod engageable with said journal means.

2. A trailer hitch comprising a piston rod, means for detachably securing said rod to a prime mover, means for journalling said rod adapted to be secured to a trailer drawbar, brake actuation means pivotally associated with said rod, means for retaining said rod in selected positions, thereby retaining said brake actuation means in selected positions, resilient means for limiting the travel of said rod, said rod retaining means comprising a boss detachably and selectively positionable on said rod.

3. In a safety device, a trailer having a drawbar, and a hydraulically operable brake system, a hydraulic cylinder on said drawbar having a piston, a rod pivoted to said piston, means for journalling said rod adjustably positioned on said rod, means for selectively limiting the travel of said rod, means on said rod for securing said rod to a prime mover, said journal means having lubricant receiving means therein, said limiting means including a boss detachably and selectively positioned on said rod.

4. In a safety device, a trailer having a drawbar, and a hydraulically operable brake system, a hydraulic cylinder on said drawbar having a piston, a rod pivoted to said piston, means for journalling said rod adjustably positioned on said rod, means for selectively limiting the travel of said rod, means on said rod for securing said rod to a prime mover, said journal means having lubricant receiving means therein, said limiting means including a boss detachably and selectively positioned on said rod, bumpers secured to said rod engageable with said boss for urging said boss against said journal means.

RUDOLPH O. MESSIER.

REFERENCES CITED

The following references are of record in the file of this patent:

UNITED STATES PATENTS

| Number | Name | Date |
|---|---|---|
| 2,133,195 | Howard | Oct. 11, 1938 |
| 2,158,175 | Coppola et al. | May 16, 1939 |
| 2,401,084 | Landahl | May 28, 1946 |